United States Patent

[11] 3,578,818

[72] Inventor Peter De Hertel Eastcott
  Peterborough, Ontario, Canada
[21] Appl. No. 859,345
[22] Filed Sept. 19, 1969
[45] Patented May 18, 1971
[73] Assignee Canadian General Electric Company Limited
  Toronto, Ontario, Canada

[54] PNEUMATIC ENGINE FOR MINE HOIST BRAKING
  13 Claims, 1 Drawing Fig.
[52] U.S. Cl. .................................................... 303/16,
  188/182, 192/2
[51] Int. Cl. .................................................. B60x 7/12
[50] Field of Search .......................................... 188/174,
  182, 189; 192/2, 17 (A), 17 (C); 303/3, 13—16, 21

[56] References Cited
  UNITED STATES PATENTS
  2,258,756 10/1944 Gray ............................ 188/182X
  3,058,547 10/1962 Tiley et al. ..................... 303/15X
  3,090,651 5/1963 Clarke ........................... 303/15X
  3,181,665 5/1965 Trombetta ..................... 192/2

Primary Examiner—Duane A. Reger
Attorneys—Raymond A. Eckersley, Frank L. Neuhauser, Oscar B. Waddell and Joseph B. Forman

ABSTRACT: Instead of using a single large pneumatic actuator for driving the brake shoes against the rotating brake surface, this invention uses a number of smaller pneumatic actuators, controlled individually and collectively by means of a regulator, for driving the shoes against the braking surfaces. The actuators are coupled with the brake shoes and the pneumatic fluid is controlled by the regulator such that one actuator normally applies the brakes for a medium or light braking effort and it is assisted by one or more of the other actuators when the braking effort required is greater than the one can deliver. In some instances, it may be desirable to construct the actuator as a single multistage unit wherein one stage is in command of the braking and is assisted by the others whenever necessary. The braking equipment also includes the well-known falling weight for emergency application of the brakes in the event of loss of the pneumatic fluid; otherwise the weight plays no part in the braking operation.

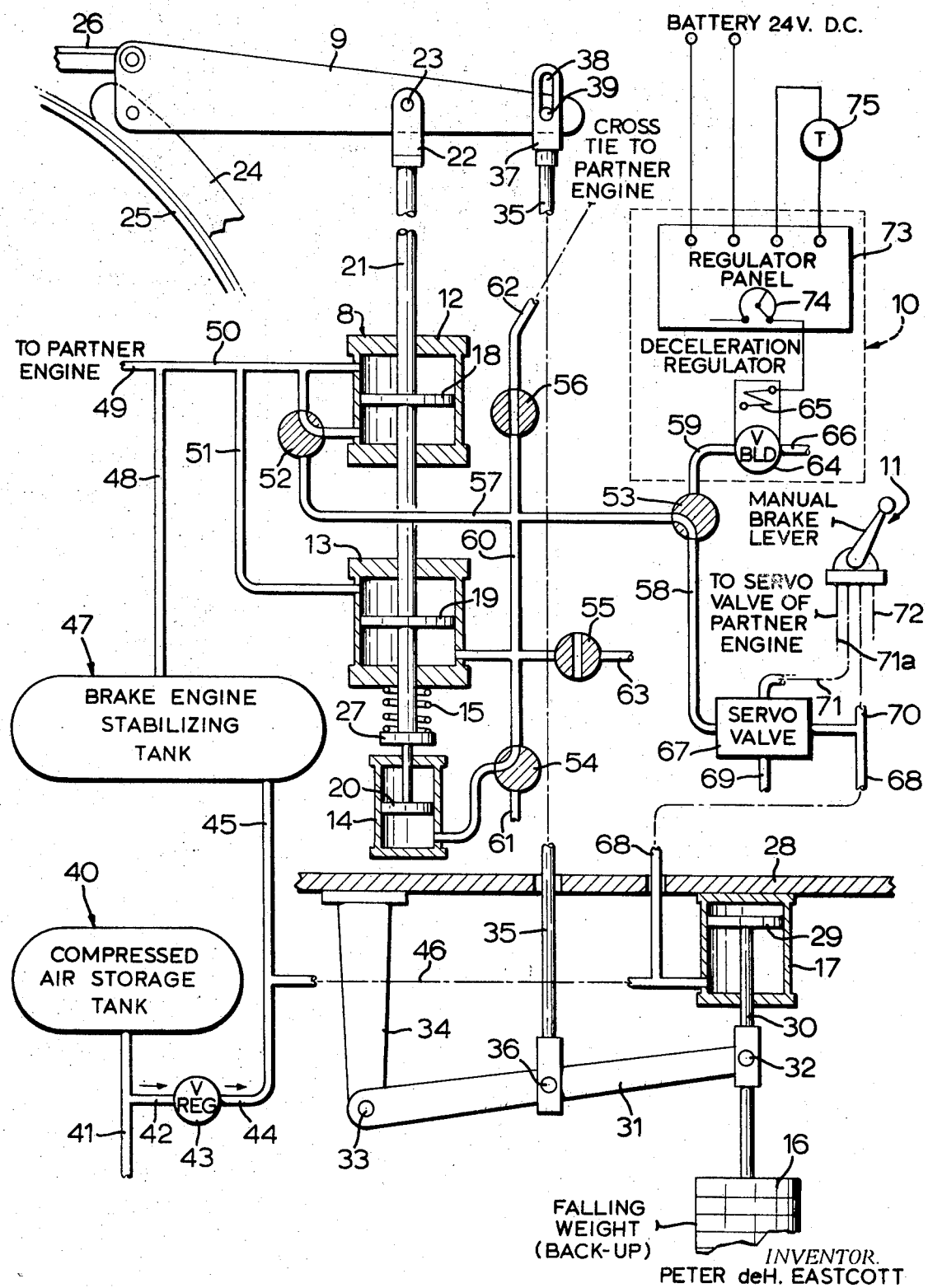

PNEUMATIC ENGINE FOR MINE HOIST BRAKING

This invention relates to pneumatic braking systems, and in particular to braking systems for mine hoists.

As is well known a mine hoist is subjected to very severe loading, varying from one extreme of an empty conveyance at the mine head to another extreme of a heavily loaded conveyance at the bottom of the mine shaft uncoupled from its counterbalancing conveyance. Whether the load be an empty conveyance, or a heavily loaded conveyance plus a long length of rope, the lifting drive and the braking equipment must be capable of fast and efficient operation under all conditions, including the extremes which worsen as the depth of a mine increases. This introduces innumerable problems in braking, the brakes being, of course, the most critical part of the hoist. They must be fail proof, or as near thereto as possible, and they must also take over full control in the event of a failure of the lifting device. Hence, adequate brakes under one set of operating conditions may be totally inadequate under different conditions. For example, the rate that the brakes are applied to control a heavy load in a suitable way will be far too severe for a light load, and a rate suitable for a light load will be insufficient for a heavy load. Most of the braking is done during normal operating conditions when the conveyances are coupled together, one acting as a counterbalance for the other. When hoisting is changed from one level to another, conditions are abnormal in the sense that the cable winding drums must be uncoupled and braked individually. This calls for much more braking capacity than is necessary for balanced hoisting. As a result, the brakes are generally designed for abnormal conditions and adapted for the best performance possible under normal and light operating conditions.

Braking equipment designed according to this invention retains the prior art capabilities of coping adequately with the abnormal conditions and yet improves the braking performance during normal and light loads. Instead of using a single large pneumatic actuator for driving the brake shoes against the rotating brake surface, this invention uses a number of smaller pneumatic actuators, controlled individually and collectively by means of a regulator, for driving the shoes against the braking surface. The actuators are coupled with the brake shoes and the pneumatic fluid is controlled by the regulator such that one actuator normally applies the brakes for a medium or light braking effort and it is assisted by one or more of the other actuators when the braking effort required is greater ta than one can deliver. In some instances, it may be desirable to construct the actuator as a single multistage unit wherein one stage is in command of the braking and is assisted by the others whenever necessary. The braking equipment also includes the well known falling weight for emergency application of the brakes in the event of loss of the pneumatic fluid; otherwise the weight plays no part in the braking operation.

The following detailed specification will aid in a fuller understanding of the invention when taken in conjunction with the appended diagram of a mine hoist braking system.

Mine hoists of the drum winder type usually have two separate conveyances of which one acts as a counterbalance for the other. The cable winding apparatus has two separate drums coupled together by means of a clutch and the ropes oppositely wound on the drums so that as one drum takes on tope the other lets out rope. Since one drum must be capable of operating alone while the other is braked for purposes of changing the operating level, a braking engine is provided for each. To change levels, the operator uses the clutch to release one drum from the drive and holds it stationary with its brake while he operates the other drum by means of the drive and its brake. The braking engine now to be described is one of the two used with this kind of hoist. When the two drums are coupled together, the operation will be referred to hereinafter as "balanced hoistings," and when the two drums are uncoupled, the operation will be referred to as "single line" hoisting. This invention employs two levels of braking, one level for balanced operation and another higher level for single line operation.

A preferred embodiment of the invention will now be described with reference to the drawings. In this drawing there is shown the equipment necessary for operating the brakes of one drum of a two drum winder, the other drum being braked in the same way by means of similar equipment. The equipment includes a pen pneumatic engine 8 coupled mechanically to a brake arm 9, a deceleration regulator 10, and manual control 11. The power drive of the engine consist essentially of two pneumatic brake applying cylinders 12 and 13, a pneumatic brake releasing cylinder 14, a compression coil spring 15 for priming the brakes, and a heavy weight 16 held up in an elevated position by means of a pneumatic cylinder 17. Cylinders 12, 13 and 14 are held stationary in axial alignment and have their pistons 18, 19 and 20 attached to a common rod 21 which has a clevis 22 on its upper end pivotally connected to the outer end of arm 9, i.e., right end, by means of a pin 23. Movement of pistons 18 and 19 downward drives arm 9 clockwise to apply the brakes and movement of the rod upward releases the brakes. The brake itself is well known, consisting of a brake drum 25 and a pair of brake shoes located on opposite sides of the drum, one of which is shown at 24. The lower end of the shoe pivots on a pin and the upper ends of the shoes are connected to the inner end of the arm 9, shoe 24, directly and the other shoe through a tie rod 26. Hence, when the arm is turned clockwise shoe 24 and its companion shoe are forced against brake drum 25, whereby braking motion of the drum. Turning the arm counterclockwise causes the shoes to move away from the drum, releasing the brakes. Spring 15 surrounds rod 21 and is compressed between the bottom end of cylinder 13 and a collar 27 on the rod so that the energy stored in the spring always acts to apply the brakes. Cylinder 17 is mounted on a base structure 28 with its axis vertical and has its piston 29 attached to a rod 30 which hangs vertically downward from the piston and supports weight 16 on its lower end. Air under pressure, in cylinder 17 under its piston 29 holds the weight up; however, should this pressure be lost due to a loss of pressure in the engine, the weight drops and applies the brakes. This is an emergency device which stops the hoist and holds it stopped until the pressure is restored or other measures taken to operate the brakes on an emergency basis. The falling of weight 16 drives arm 9 clockwise through the following mechanism: an arm 31 pivotally connected at one end 32 to rod 30 and at the other end 33 to a stationary support 34; a rod 35 pivotally connected at its lower end 36 to a midpoint of arm 31; and a clevis 37 secured to the upper end of the rod and slotted at 38 for loosely receiving a pin 39 secured to the outer end of arm 9. The slot and pin constitute a lost motion linkage which allows the braking arm to move freely of the emergency falling weight mechanism during normal braking operations, but also allows the weight to apply the brakes after is has fallen a certain distance.

The pneumatic equipment used in the engine with the double cylinder drive will now be described. Whenever reference is made to a line this means an air line or pipe used for conveying air from one point to another. Compressed air is supplied to a storage tank 40 by way of line 41 from a suitable source of air compressed at a relatively high pressure. This air is led off line 41 into a line 42, through a valve 43 which reduces the pressure of the air to about 70 p.s.i., into a line 44 which branches off into two lines 45 and 46. Line 45 goes to another tank 47 where a large volume of compressed air is stored at 70 p.s.i. as a stable source of air of the proper operating pressure, and line 47 goes to cylinder 17 on the under side of its piston 29 where the pressure acts on the piston to hold weight 16 up in its elevated position. An outlet line 38 from tank 47 branches off at 50 to engine 8 and at 49 to a similar engine for braking the other drum. This other engine is known as the partner engine. Line 50 allows compressed air to flow directly from tank 47 into cylinder 12 above its piston 18, and a takeoff line 51 allows compressed air to flow directly from tank 47 into cylinder 13 above its piston 19. Since the upper sides of these pistons are at all times exposed to the full thrust of the compressed air in tank 47, both pistons are continually urged downward at the maximum push that the compressed air is capable of. The force urging the pistons downward acts on both pistons in a direction to apply the brakes i.e., it tends to drive rod 21 downward and thereby arm 9 clockwise. Hence the upper ends of the two cylinders are always charged for full braking by virtue of their direct connection to tank 47. Control of the braking applied is effected through the control of the air to the under side of pistons 18 and 19.

Numerals 52, 53 and 54 denote selector valves and numerals 55 and 56 off-on valves. These are all two-position magnet valves which take the position shown when electrically energized and their other positions when deenergized. In the energized portions shown, valve 52 connects line 50 to the bottom end of cylinder 12, valve 53 connects line 57 to line 58, and valve 54 connects line 60 to the bottom end of cylinder 14; in their deenergized positions, valve 52 connects the bottom end of cylinder 12 to line 57, valve 53 connects line 57 to line 59, and valve 54 connects the bottom end of cylinder 14 to an exhaust outlet 61. As clearly shown in the drawing line 60 is interconnected with line 57, and is connected to the bottom end of cylinder 13. In the energized positions shown, valve 55 is closed and valve 56 is open so as to connect line 60 to a line 62 going to the other braking engines; in their deenergized positions valve 55 is open so as to vent the bottom ends of cylinders 13 and 14 to the atmosphere through the exhaust outlet 63, and valve 56 is closed. A normally open bleed valve 64 is closed by electrically energizing its coil 65 from deceleration regulator 10 so as to connect line 59 to an outlet 66. This normally open valve is closed on command from regulator 10 by the energy applied to coil 65. A servovalve 67 is connected to line 58 and to a line 68 communicating with the high pressure line 46, and has an exhaust outlet 69. It is operated by means of compressed air, and its operation is controlled through manual control 11 which is connected to line 68 and the servovalve via lines 70 and 71 respectively.

Manual control valve 11 may be any one of a number of well known manually adjustable pressure regulating valves which receives air from line 70 at high pressure and delivers this air to line 71 at a pressure reduced in direct proportion to the setting on its handle. This handle is movable manually between two extreme position; in one extreme position the air in line 71 is at atmospheric pressure and in the other extreme position it is at the full pressure in line 70. Hence, valve 11 can increase the pressure in line 71 by moving its handle in the direction which admits more air from line 70 and decrease this pressure by moving the handle in the other direction which exhausts air from line 71 via the exhaust outlet 69. The air pressure in line 71 controls servovalve 67, and it in turn controls the pressure of the air fed into line 58 from line 68. Servovalve 67 is a volume amplifier which continuously regulates the air pressure in line 58 according to the pilot pressure from line 71. An increase in pilot pressure causes the servovalve to increase the pressure in line 58 from line 68, and a decrease in pilot pressure causes the servovalve to decrease the pressure in line 58 by exhausting air from this line to the atmosphere through outlet 69. Thus the air pressure in line 58 is essentially proportional to the position of the handle on valve 11 at all times. Another line 71a, carrying the same air pressure as line 71, goes to a servovalve like 67 for the partner engine.

During balanced hoisting the two braking engines operate together, but during the time that the clutch is released the two engines operate independently. The various modes of operation will now be outlined under different headings.

MANUAL CONTROL

In the condition illustrated in the drawing, the drums are coupled together for balanced hoisting. Under these conditions, valves 52, 53, 54, 55 and 56 are energized and in the positions shown. As a result both engines operate together on their lower cylinders 13, the upper cylinders 12 being inactive because both ends of pistons 18 are at full system pressure.

Assume now that the brakes are applied and the operator wishes to release them. To do so he manipulates the lever of control 11 to the position where it causes servovalve 67 to apply compressed air to the bottom ends of cylinders 13 and 14 at the pressure set by the lever. This air flows from tank 47 via lines 45, 46, and 68, servovalve 67, line 58, valve 53, lines 57 and 60 to cylinder 13 and valve 54 to cylinder 14. As compressed air is applied to the under side of piston 19, its downward thrust decreases, relaxing the braking force applied to arm 9. When the pressures below and above piston 19 equalize, the only braking effort remaining is that due to spring 15 and the weight of arm 9, rod 21 and pistons 18, 19 and 20. At this point, however, the lower end of cylinder 14 is also at system pressure, and as a result its piston 20 urges rod 21 upward against the force of spring 15 just enough to free the brake shoes from the brake drum. To apply the brakes again, the operator manipulates the lever of control 11 into the position where it causes the servovalve 67 to decrease the pressure in the bottom ends of cylinders 13 and 14 by allowing air to escape therefrom via valve 54, lines 60 and 57, valve 53, line 58, valve 67 and outlet 69. As the pressure below piston 19 decreases, the higher pressure above the piston forces it down to apply the brakes again. Control 11 and servovalve 67 are so designed that the air pressure can be accurately controlled so that either releasing or applying the brakes will be as smooth as the skill of the operator. It is to be noted that during the normal braking operation just outlined that valve 56 remains open; as a result, the lower cylinder of the other braking engine operates in synchronism with cylinder 13, releasing or applying the brakes of the other drum in synchronism with braking operations of this drum.

If the operator now wishes to change the level from which the conveyances operate, he locates the conveyance attached to one of the drums at the new level, and follows certain procedural steps in relocating the other conveyance. Interlocking devices demand that these steps follow a particular pattern, which is general are as follows: (1) The operator sets valves 52 in both engines so they activate the upper brake cylinders, in which setting valve 52 connects the bottom end of cylinder 12 to line 57. Cylinder 12 will now assist cylinder 13 in the braking because its piston 18 is subjected to the same pressure differential as piston 19. (2) He applied the brake fully to both drums by exhausting air from the bottom ends of both cylinders. (3) He isolates the other braking engine from engine 8 by closing valve 56 and setting any other controls provided for this purpose. (4) With the brake shoes for drum 25 now clamped firmly on the drum by means of both cylinders 12 and 13, he places the conveyance attached to the other drum in the proper location for balanced hoisting from the newly selected level. (5) He engages the clutch and restores the system to its former state of single cylinder braking. The procedure outlines above, is, of course, a gross over simplification of the actual situation; it is intended only to illustrate in a very general way the main purpose of the two cylinder braking engine. It requires very little knowledge of hoisting to realize that much more braking effort is required for uncoupled drums than for counterbalanced drums; the second cylinder in each engine supplies the additional effort. The application of two-cylinder braking is not necessarily restricted to level changing; it can be applied whenever the operator feels that there is a need to do so.

EMERGENCY STOPPING

The braking engines are designed for fail safe operation under emergency conditions. (1) If the engine fails through loss of its air pressure, the piston of cylinder 17 is no longer able to hold up weight 16. As the weight descends, it applies the brakes through its mechanical linkage 30 to 39 with brake arm 9. (2) If the electrical power from the main source fails a standby battery takes over immediately and maintains normal braking operation for the emergency stop. (3) In the event that valves 52 to 55 should become deenergized through failure of the battery as well, the main source valve 52 connects the bottom end of cylinder 12 to line 57, valve 53 connects line 57 to line 59 and thereby shuts off the air supply from line 58, valve 54 vents the bottom end of cylinder 14 to the atmosphere through its outlet 61, and valve 55 vents the bottom ends of cylinders 12 and 13 to the atmosphere through its outlet 63. This applies the brakes and stops the hoist, probably much more abruptly than otherwise This is a highly unlikely situation indeed. In practice, emergency braking is relatively complicated because numerous control devices become involved in the process. A means for controlling the deceleration of the hoist will be dealt with very briefly later under the next heading. Since full particulars on the various controls are not essential for an understanding of this invention, they have not been illustrated or described.

DECELERATION REGULATOR

Assume that during a winding cycle the controller senses an overspeed above a set value. In response to this overspeed it initiates an emergency braking operation which includes deenergization valves 53 and 54 of both engines. Valve 54 now vents cylinder 14 to the atmosphere, allowing spring 15 to bring the brake shoes into light contact with the brake drum. Valve 53 connects line 57 to line 59 so that the bottom end of brake cylinder 13 can now be vented to the atmosphere through bleed valve 64. The rate of exhausting air from the brake cylinder is now controlled by the bleed valve through deenergizing its normally energized coil 65 by deceleration regulator 10. As the coil is deenergized, the valve opens, allowing air to escape from line 59 via outlet 66. The regulator includes a rate regulator 73 having a potentiometer 74 for setting a value of deceleration for the hoist, and a tachometer 75 driven by the hoist and generating an electrical signal representing hoist speed. As the brakes decelerate the hoist, the voltage from the tachometer generator falls in direct proportion to the decrease in speed. The rate regulator monitors these changes in tachometer voltage and when the voltage is equal to or exceeds the set value, the regulator causes valve 64 to close so as to prevent a further increase in the deceleration rate. In the event that the rate of deceleration drops below the set value, the regulator will call for an increase of braking by opening valve 64 for a short interval. By this means the regulator holds deceleration at the set value. At the instant that the winder comes to rest, the tachometer voltage becomes zero. Sensing this, the regulator causes the brakes to be fully applied. The regulator is provided with a discriminating circuit by means of which it senses a difference between a decrease in speed in the forward direction and an increase in speed in the reverse direction; consequently, even though a few feet of roll back may occur, there is no possibility of the deceleration regulator interfering with full brake application. During deceleration, the brakes were applied by only one of the two cylinders available for braking purposes, as a result, smoother braking is to be expected than what is possible with an equivalent single cylinder engine.

Another advantage inherent in the two cylinder engine over the equivalent single cylinder engine is that emergency stopping will be far less abrupt in the event of regulator failure because one of two small cylinders is now suddenly applying the brakes rather than one large cylinder. In other words, only one-half of the total braking capacity is suddenly activated for the emergency stop. The regulator is fail safe in that valve 64 is normally open and must be energized from the regulator to hold off some of the braking effort that it would otherwise allow. Deenergizing coil 65 allows valve 64 to open fully, and this allows the air to escape freely from the lower end of cylinder 13 via lines 60 and 57, valve 53, line 59, valve 64 and outlet 66. Hence cylinder 13 immediately applies the brakes fully without any control of the rate of application. Even though cylinder 13 applies the brakes at an uncontrolled rate, they are applied far less harshly than they would be with the entire braking capacity active as would be the case with a braking engine having but one cylinder. Hence, with the two cylinder engine, regulator controlled deceleration as well as uncontrolled emergency braking are much to be preferred over that of the single cylinder engine.

What I claim as new and desire to secure by Letters Patent of the United States is:

I claim:

1. In a system for braking a hoist, a set of brakes for braking the hoist and a pneumatic engine for operating the brakes, said engine comprising a source of compressed air; at least two brake actuators operated by said compressed air; means for coupling said actuators together and to said brakes for actuation thereof; means for controlling the air supply to at least one of said actuators for selectively applying or releasing the brakes; means for controlling the air supply to said other actuators for selectively rendering one or more of them inoperative or operative for assisting said one actuator in applying brakes; a relatively heavy weight, another actuator connected directly to said compressed air source for operation by the compressed air for holding said weight in an elevated position but allowing the weight to descend when the pressure decreases below a predetermined value; mechanical means linking said weight with said brakes for application of the brakes by the descending weight; and means for allowing said actuators fee freedom of braking operation from said weight and the linkage operatively associated with the weight.

2. In a system for braking a hoist, a set of brakes for braking the hoist and a pneumatic engine for operating the brakes, said engine comprising a source of compressed air; at least two brake cylinders each having a double acting piston operated by said compressed air; means for coupling said pistons together and to said brakes such that compressed air in one end of said cylinders urges piston movement for applying the brakes and compressed air in the other end of said cylinders urges piston movement for releasing the brakes; air lines connecting said one end of said cylinders directly to said source of compressed air; a two-way selector valve for at least one of said cylinders, said valve having one way interconnecting the two ends of the cylinder and the other way connecting said other end of the cylinder to an air line means which is also connected to said other ends of the remaining cylinders; a two-way flow control valve having one way connecting said air line means to said source of compressed air and the other way connecting said air line means to the atmosphere; a relatively heavy weight; another cylinder having a single acting piston supporting said weight; another air line connecting said source of compressed air directly to one end of said other cylinder so the air therein causes the piston to hold the weight in an elevated position; mechanical means linking said weight with said brakes for application of the brakes by the descending weight when the air pressure decreases below a predetermined value; and means for allowing said double acting pistons freedom of braking movement from the elevated weight and its linkage with the brakes.

3. In a system for braking a hoist, a set of brakes for braking the hoist and a pneumatic engine for operating the brakes, said engine comprising a source of compressed air; two brake cylinders each having a double acting piston operated by said compressed air; means for coupling said pistons together and to said brakes such that compressed air in one end of said cylinders urges piston movement for applying the brakes and compressed air in the other end of said cylinders urges piston movement for releasing the brakes; air lines connecting said one end of said cylinders directly to said source of compressed air; a two-way selector valve for one of said cylinders, said valve having one way interconnecting the two ends of the cylinder and the other way connecting said other end of the cylinder to an air line means which is also connected to said other end of the other cylinder; a two-way flow control valve having one way connecting said air line means to said source of compressed air and the other way connecting said air line means to the atmosphere; a relatively heavy weight; another cylinder having a single acting piston supporting said weight;

another air line connecting said source of compressed air directly to one end of said other cylinder so the air therein causes the piston to hold the weight in an elevated position; mechanical means linking said weight with said brakes for application of the brakes by the descending weight when the air pressure decreases below a predetermined value; and means for allowing said double acting pistons freedom of braking movement from the elevated weight and its linkage with the brakes.

4. The braking engine defined in claim 2 wherein said flow control valve is a servovalve operated pneumatically from manual controls.

The braking engine defined in claim 2 wherein said air line means incorporates a two-way selector valve normally having one way in said air line means and in its other position disconnecting the air line means from the flow control valve and connecting it to a bleed valve vented to the atmosphere, and a hoist deceleration regulator for controlling the rate that the bleed valve exhausts air from the line means.

6. The braking engine defined in claim 2 wherein a compressed air cylinder is provided for releasing the brakes, said cylinder having a single acting piston coupled to said double acting pistons and having one end connected to said air line means so compressed air from the line urges the piston to release the brakes; and wherein there is also provided a coil spring compressed by the release cylinder while releasing the brakes.

7. In a system for braking a hoist, a set of brakes for braking the hoist and a pneumatic engine for operating the brakes, said engine comprising a source of compressed air; two brake cylinders each having a double acting piston operated by said compressed air; means for coupling said pistons together and to said brakes such that compressed air in one end of said cylinders urges piston movement for applying the brakes and compressed air in the other end of said cylinders urges piston movement for releasing the brakes; air lines connecting said one end of said cylinders directly to said source of compressed air; a two-way selector valve for one of said cylinders, said valve having one way interconnecting the two ends of the cylinder and the other way connecting said other end of the cylinder to another air line which is also connected to said other end of the other cylinder; a bleed valve connected to said other air line for exhausting air therefrom; and a regulator for controlling said bleed valve whereby the air exhausted from said other line is controlled by said regulator.

8. The braking engine defined in claim 7 wherein said bleed valve is normally open and its closing is controlled by said regulator.

9. The braking engine defined in claim 7 wherein said bleed valve is normally open valve electrically operated for closing from said regulator, and said regulator is an electrical control device for producing an electrical output proportional to hoist deceleration, the extent of valve closing being proportional to the magnitude of said electrical output.

10. In a system for braking a hoist, a set of brakes for braking the hoist and a pneumatic engine for operating the brakes, said engine comprising a source of compressed air; two brake cylinders each having a double acting piston operated by said compressed air; means for coupling said pistons together and to said brakes such that compressed air in one end of said cylinders urges piston movement for applying the brakes and compressed air in the other end of said cylinders urges piston movement for releasing the brakes; air lines connecting said one end of said cylinders directly to said source of compressed air; a two-way selector valve for one of said cylinders, said valve having one way interconnecting the two ends of the cylinder and the other way connecting said other end of the cylinder to another air line which is also connected to said other end of the other cylinder; a deceleration regulator for controlling the braking of said hoist according to the deceleration thereof; means operated manually for controlling the braking of said hoist; and another two-way selector valve connected by air lines to said regulator; said manual control means and said other air line for selectively connecting said deceleration regulator or said manual control means to said other air line.

11. In a system for braking a hoist, a set of brakes for braking the hoist and a pneumatic engine for operating the brakes, said engine comprising a source of compressed air; two brake cylinders each having a double acting piston operated by said compressed air; means for coupling said pistons together and to said brakes such that compressed air in one end of said cylinders urges piston movement for applying the brakes and compressed air in the other end of said cylinders urges piston movement for releasing the brakes; air lines connecting said one end of said cylinders directly to said source of compressed air; a two-way selector valve for one of said cylinders, said valve having one way interconnecting the two ends of the cylinder and the other way connecting said other end of the cylinder to another air line which is also connected to said other end of the other cylinder; a deceleration regulator for controlling the braking of said hoist according to the deceleration thereof; a servovalve having first and second main ports and a vent port; another two-way selector valve connected by air lines to said regulator said first port of the servovalve and said other air line for selectively connecting said deceleration regulator or said servovalve to said other air line; an additional air line connecting said second port of the servovalve to said source of compressed air; and manually operated means for controlling said servovalve for selectively allowing compressed air to flow from said second port to said first port or from said first port to said vent port.

12. The braking engine defined in claim 11 wherein said manually operated control valve is supplied with compressed air from said source of compressed air and connected to said servovalve for control thereof in response to manual manipulation of the control valve.

13. The braking engine defined in claim 11 wherein said other air line is connected to one side of a power actuated off-on valve which has its other side vented to the atmosphere, said off-on valve being closed when energized and open when deenergized.